(12) United States Patent
Zhang et al.

(10) Patent No.: US 8,620,223 B2
(45) Date of Patent: Dec. 31, 2013

(54) METHOD AND BASE STATION FOR MANAGING CAPACITY OF A WIRELESS COMMUNICATION NETWORK

(71) Applicant: Huawei Technologies Co., Ltd., Guangdong (CN)

(72) Inventors: Shunqing Zhang, Shenzhen (CN); Tingting Geng, Shenzhen (CN); Yan Chen, Shenzhen (CN); Wei Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/686,105

(22) Filed: Nov. 27, 2012

(65) Prior Publication Data

US 2013/0171983 A1 Jul. 4, 2013

Related U.S. Application Data

(63) Continuation of application No. PCT/CN2012/075934, filed on May 23, 2012.

(30) Foreign Application Priority Data

Dec. 28, 2011 (CN) .......................... 2011 1 0448641

(51) Int. Cl.
*H04B 17/00* (2006.01)
*H04B 7/216* (2006.01)
*H04W 24/00* (2009.01)
*H04J 3/14* (2006.01)
*H04J 3/08* (2006.01)

(52) U.S. Cl.
USPC ................. 455/67.11; 455/67.13; 455/67.14; 455/423; 455/424; 455/425; 370/236; 370/252; 370/315; 370/342

(58) Field of Classification Search
USPC ............ 455/1, 63.1, 67.13, 73, 77, 86, 114.2, 455/278.1, 423, 427, 445, 456.1, 456.5, 455/550.1, 552.1, 574, 562.1, 333, 334, 455/125, 234.1, 260, 446, 450–451, 453, 455/510, 67.11, 67.14, 424, 425; 370/217, 370/222, 252, 258, 335, 236, 315, 342; 375/135, 219; 340/988, 996
See application file for complete search history.

(56) References Cited

U.S. PATENT DOCUMENTS 5,548,813 A 8/1996 Charas et al.
6,072,778 A 6/2000 Labedz et al.
(Continued)

FOREIGN PATENT DOCUMENTS

CN 1144592 A 3/1997
CN 1205138 A 1/1999
(Continued)

OTHER PUBLICATIONS

International Search Report and Written Opinion issued in corresponding PCT application No. PCT/CN2012/075934, dated Nov. 8, 2012, total 14 pages.

*Primary Examiner* — Inder Mehra
(74) *Attorney, Agent, or Firm* — Leydig, Voit & Mayer, Ltd.

(57) ABSTRACT

The present invention provides a method and a base station for managing capacity of a wireless communication network, which relates to the field of wireless communications and is capable of saving energy while adjusting capacity of a wireless communication network of a base station. The present invention includes: checking total traffic of all overlay networks belonging to the base station; if the checked total traffic keeps being smaller than a preset load threshold, searching for and determining a first overlay network; maintaining normal work of a power amplifier of at least one antenna in each group of antennas in the first overlay network and turning off power amplifiers of one or more other antennas; and connecting the one or more other antennas to the power amplifiers maintaining normal work in the groups in which the one or more other antennas are located.

14 Claims, 9 Drawing Sheets

(56) References Cited

U.S. PATENT DOCUMENTS

| | | | |
|---|---|---|---|
| 6,347,226 | B1 | 2/2002 | Virtanen |
| 6,843,620 | B2* | 1/2005 | Inayama ................ 407/114 |
| 2006/0215601 | A1* | 9/2006 | Vleugels et al. ............ 370/328 |
| 2009/0023477 | A1* | 1/2009 | Staudte .................. 455/562.1 |
| 2012/0329449 | A1* | 12/2012 | Das et al. ................ 455/423 |

FOREIGN PATENT DOCUMENTS

| | | |
|---|---|---|
| CN | 1258425 A | 6/2000 |
| CN | 101394647 A | 3/2009 |
| CN | 101998435 A | 3/2011 |

* cited by examiner

METHOD AND BASE STATION FOR MANAGING CAPACITY OF A WIRELESS COMMUNICATION NETWORK

CROSS-REFERENCE TO RELATED APPLICATIONS

This application is a continuation of International Application No. PCT/CN2012/075934, filed on May 23, 2012, which claims priority to Chinese Patent Application No. 201110448641.X, filed on Dec. 28, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of wireless communications, and in particular, to a method and a base station for managing capacity of a wireless communication network.

BACKGROUND

With the rapid development of communication users and communication services, the existing cell resources cannot satisfy the increasing demand of traffic. Therefore, the capacity of a communication system needs to be expanded. Capacity expansion of the communication system may be implemented in the following manner: the number of antennas is increased, and new cell resources are configured for antennas, so that new cell resources are added, and cell splitting is implemented. In this manner, the capacity of the communication system is improved, and cell resources are increased. However, when the traffic is low, the existing network capacity needs to be managed to reduce system physical resources. In a multiple-antenna network structure, a method for reducing the system physical resources is cell combination, and specifically is, deleting cell resources of multiple antennas corresponding to multiple cells, or, deleting cell resources of multiple antennas corresponding to a same cell, and configuring, for the multiple antennas, cell resources which are the same as cell resources of another cell. In the foregoing implementation manner for cell combination, relevant devices, such as the antennas, are not turned off when the traffic is low, thereby wasting energy.

SUMMARY

Embodiments of the present invention provide a method and a base station for managing capacity of a wireless communication network, which are capable of saving energy while adjusting service capacity of a wireless communication network of a base station.

In order to achieve the foregoing object, the embodiments of the present invention adopt the following technical solutions.

A method for managing capacity of a wireless communication network is applied to a base station with a multi-sector structure. The base station manages multiple overlay networks covering a same coverage area. The multiple overlay networks covering a same coverage area include a type 1 overlay network with a sector combining function, and multiple groups of antennas corresponding to each type 1 overlay network are configured. One power amplifier is configured for each antenna, and the method includes: checking total traffic of all the overlay networks managed by the base station; if the checked total traffic is smaller than (i.e., less than) a preset load threshold, searching for the type 1 overlay network among all the overlay networks belonging to the base station; if there is only one overlay network belonging to the type 1 overlay network, determining the overlay network as a first overlay network; if there are multiple overlay networks belonging to the type 1 overlay network, determining the first overlay network according to network status parameters of the multiple overlay networks belonging to the type 1 overlay network, where the first overlay network is a type 1 overlay network which is managed by the base station and requires network capacity management; maintaining normal work of a power amplifier of at least one antenna in each group of antennas in the first overlay network, and turning off power amplifiers of one or more other antennas; and connecting the one or more other antennas to the power amplifier maintaining normal work in the groups in which the one or more other antennas are located so that sub-sectors corresponding to each group of antennas among the multiple groups of antennas are respectively combined into multiple large sectors.

A base station for managing capacity of a wireless communication network is a base station that manages multiple overlay networks covering same cell coverage areas. The multiple overlay networks covering same cell coverage areas include a type 1 overlay network with a sector combining function, and multiple groups of antennas corresponding to each type 1 overlay network are configured. One power amplifier is configured for each antenna, and the base station includes: a check unit, configured to check total traffic of all the overlay networks managed by the base station; a search unit, configured to search for the type 1 overlay network among all the overlay networks belonging to the base station when the total traffic checked by the check unit is smaller than a preset load threshold; a determination unit, configured to, when the search unit finds only one overlay network belonging to the type 1 overlay network, determine the overlay network as a first overlay network, and when the search unit finds multiple overlay networks belonging to the type 1 overlay network, determine the first overlay network according to network status parameters of the multiple overlay networks belonging to the type 1 overlay network, where the first overlay network is a type 1 overlay network which is managed by the base station and requires network capacity management; and an adjustment unit, configured to maintain normal work of a power amplifier of at least one antenna in each group of antennas in the first overlay network, turn off the power amplifiers of one or more other antennas, and connect the one or more other antennas to the power amplifier maintaining normal work in the groups in which the one or more other antennas are located so that sub-sectors corresponding to each group of antennas among the multiple groups of antennas are respectively combined into multiple large sectors.

In the method and the base station for managing capacity of a wireless communication network provided by the embodiments of the present invention, when the checked total traffic of the network is lower than the load threshold, one overlay network requiring network capacity management is determined, the power amplifiers corresponding to a part of the configured antennas thereof are turned off, and the part of antennas are connected to power amplifiers corresponding to the one or more other antennas which work normally. Therefore, energy is saved at a prerequisite of ensuring normal work of the antennas.

BRIEF DESCRIPTION OF THE DRAWINGS

To illustrate the technical solutions according to the embodiments of the present invention or in the conventional art more clearly, the following briefly describes the accompanying drawings required for describing the embodiments or the conventional art. Apparently, the accompanying drawings in the following descriptions show merely some of the embodiments of the present invention, and a person skilled in the art can obtain other drawings according to the accompanying drawings without creative efforts.

DETAILED DESCRIPTION

The following describes technical solutions in the embodiments of the present invention with reference to the accompanying drawings. Apparently, the described embodiments are only some embodiments of the present invention, rather than all the embodiments of the present invention. All other embodiments, which can be derived by a person skilled in the art from the embodiments of the present invention without any creative effort, shall fall within the protection scope of the present invention.

Embodiment 1

Figure 1:
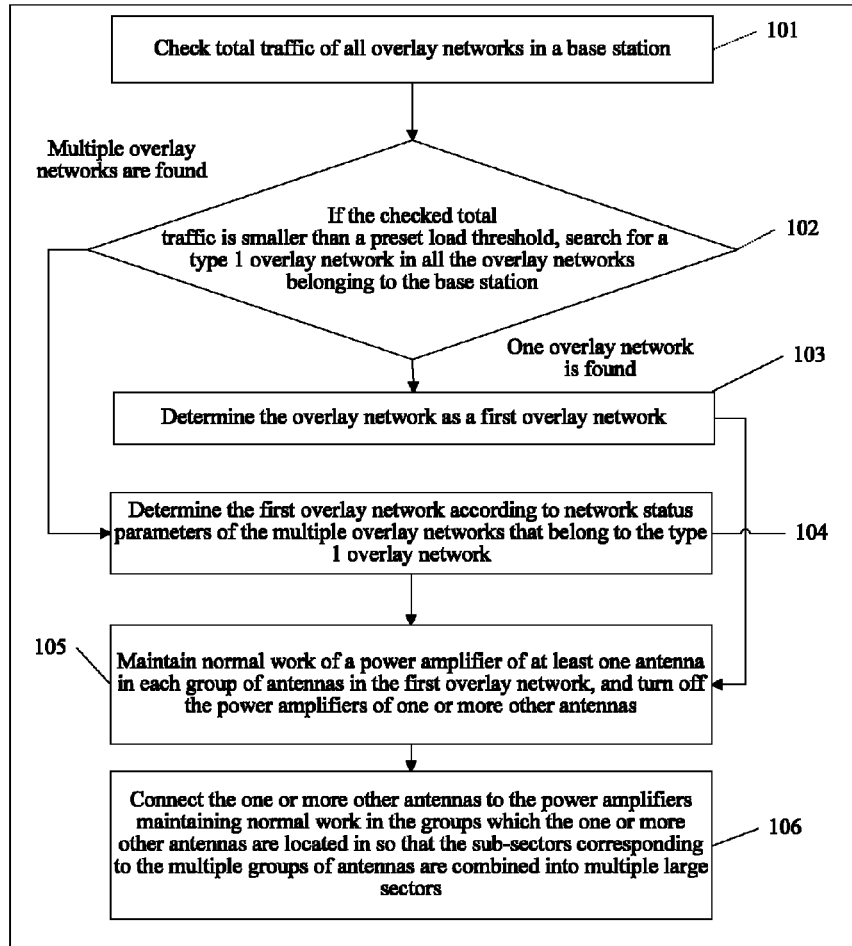
FIG. 1 is a flow chart of a method for managing capacity of a wireless communication network in Embodiment 1 of the present invention.

Embodiment 1 of the present invention provides a method for managing capacity of a wireless communication network, which is applied to a base station with a multi-sector structure. The base station manages multiple overlay networks covering a same coverage area. The multiple overlay networks covering a same coverage area include a type 1 overlay network with a sector combining function. Multiple groups of antennas corresponding to each type 1 overlay network are configured. One power amplifier is configured for each antenna. As shown in FIG. 1, the method includes:

101: Check total traffic of all the overlay networks belonging to the base station.

The check of the total traffic of all the overlay networks belonging to the base station may be checked periodically or may be performed after management personnel trigger a check action, which is not limited by the embodiment of the present invention.

102: If the checked total traffic is smaller than a preset load threshold, search for a type 1 overlay network among all the overlay networks belonging to the base station. Execute step 103 if there is only one overlay network belonging to the type 1 overlay network; execute step 104 if there are multiple overlay networks belonging to the type 1 overlay network.

103: Determine the overlay network as a first overlay network and execute step 105.

104: Determine the first overlay network according to network status parameters of the multiple overlay networks belonging to the type 1 overlay network, where the first overlay network is the type 1 overlay network which is managed by the base station and requires network capacity management, and execute step 105.

105: Maintain normal work of a power amplifier of at least one antenna in each group of antennas in the first overlay network and turn off the power amplifiers of one or more other antennas.

106: Connect the one or more other antennas to the power amplifier maintaining normal work in the groups in which the one or more other antennas are located so that the sub-sectors corresponding to the multiple groups of antennas are respectively combined into multiple large sectors.

In this embodiment, the foregoing steps may be executed by the base station or a system which manages the base station, which is not limited by the embodiment of the present invention.

In the method and the base station for managing capacity of a wireless communication network provided by the embodiment of the present invention, when the checked total traffic of the network is lower than the load threshold, one overlay network requiring network capacity management is determined, the power amplifiers corresponding to some of the configured antennas are turned off, and the antennas are connected to power amplifiers corresponding to one or more other antennas which work normally. Therefore, the energy is saved at a prerequisite of ensuring normal work of the antennas.

Embodiment 2

Based on Embodiment 1, the embodiment of the present invention is described in detail with an example of a base station with overlay networks each of a 6-sector structure. An implementation manner based on other sector structures may be implemented based on the embodiment of the present invention and in combination with specific features of the other sector structures. The specific implementation manners are all technologies well known by a person skilled in the art, and therefore the implementation manners are not described in detail in the embodiment of the present invention.

Figure 2:
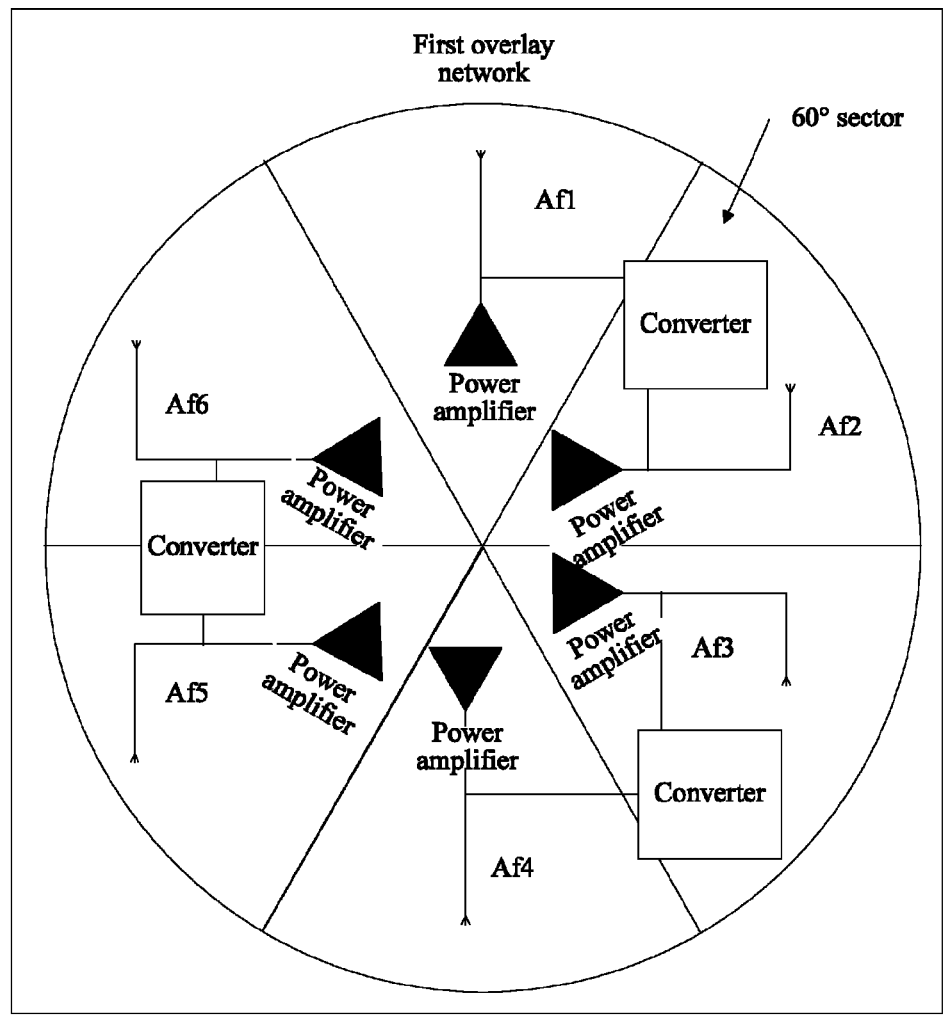
FIG. 2 is a composition block diagram of a first overlay network in Embodiment 2 of the present invention.

Multiple overlay networks of same cell coverage areas are disposed on the base station with the overlay networks each of a 6-sector structure, which includes a type 1 overlay network. As shown in FIG. 2, a specific structure of the type 1 overlay network is as follows: three groups of antennas are included, each group of antennas is formed of two antennas, namely, Af1 and Af2, Af3 and Af4, and Af5 and Af6. That is, Af1 and Af2 are set as a group, Af3 and Af4 are set as a group, and Af5 and Af6 are set as a group. Each antenna in each group of antennas corresponds to a 60° sector. The cell numbers of cells covered by the 60° sector corresponding to each antenna are the same. One power amplifier is configured for each antenna, and a converter is connected to each group of antennas.

It should be noted that, in this embodiment, the power amplifier is provided by a remote radio frequency unit. The power amplifier of each antenna may be configured in the following manners.

Figure 3:
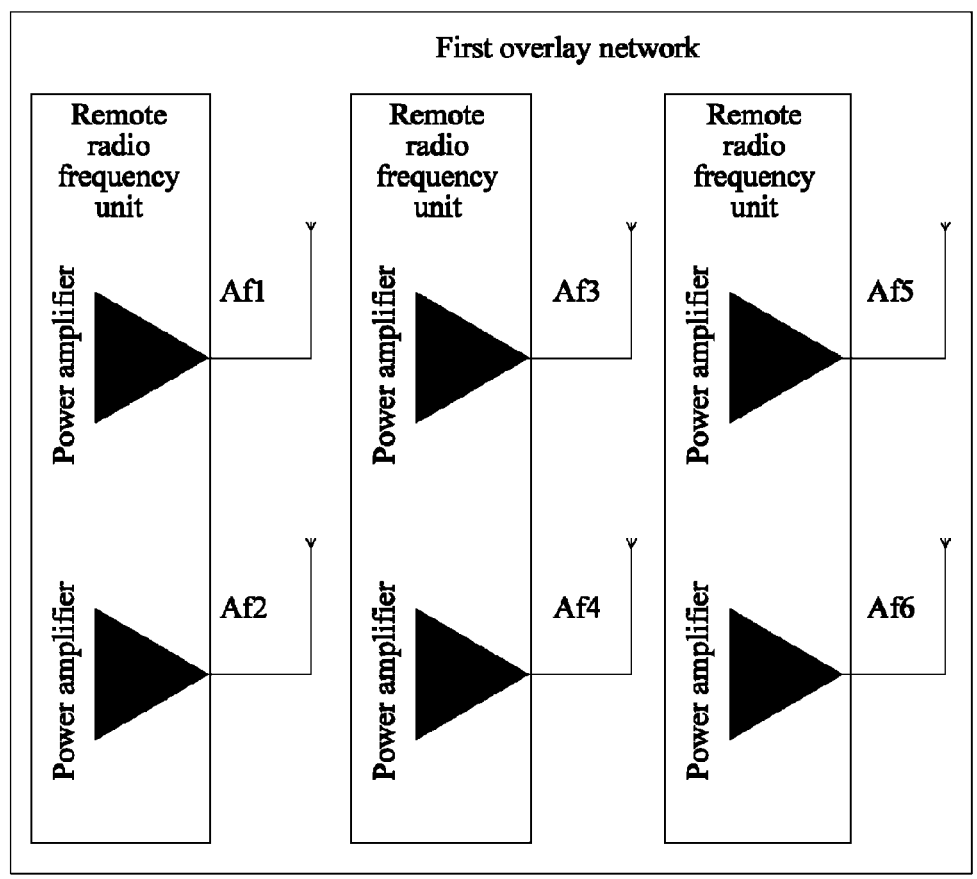
FIG. 3 is a composition block diagram of a remote radio frequency unit in Embodiment 2 of the present invention.

Configuration manner 1: as shown in FIG. 3, three remote radio frequency units are configured in a first overlay network. Each remote radio frequency unit is connected to one antenna group. Because one power amplifier is configured for each antenna, two power amplifiers are configured in each remote radio frequency unit, that is, Af1 and Af2 are connected to one remote radio frequency unit, Af3 and Af4 are connected to one remote radio frequency unit, and Af5 and Af6 are connected to one remote radio frequency unit, and two power amplifiers are configured in each remote radio frequency unit.

Figure 4:
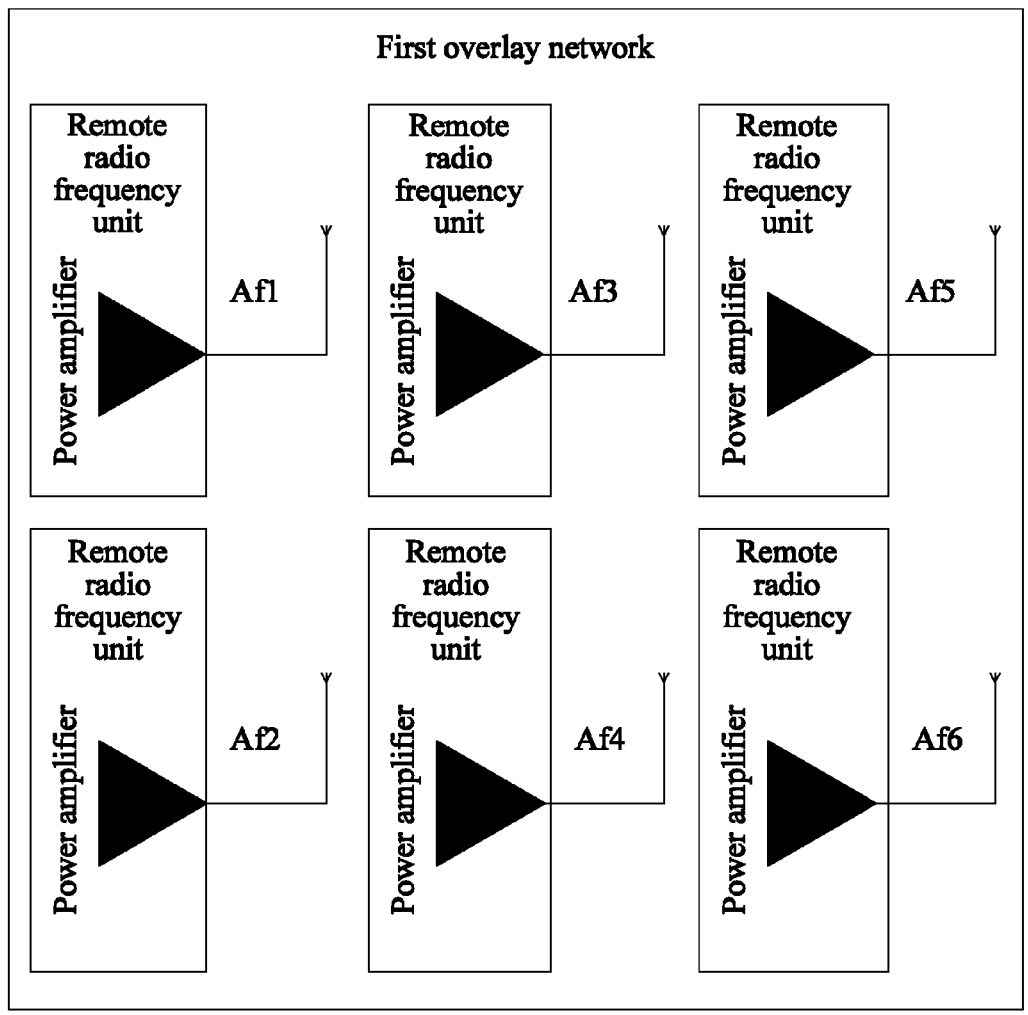
FIG. 4 is a composition block diagram of another remote radio frequency unit in Embodiment 2 of the present invention.

Configuration manner 2: as shown in FIG. 4, six remote radio frequency units are configured in the first overlay network. Each remote radio frequency unit is connected to an antenna. Because one power amplifier is configured for each antenna, one power amplifier is configured in each remote radio frequency unit, that is, each of Af1, Af2, Af3, Af4, Af5 and Af6 is connected to one remote radio frequency unit, and one power amplifier is configured in each remote radio frequency unit.

It should be noted that the power amplifier may also be provided by a non-remote radio frequency apparatus, which is not limited by the embodiment of the present invention.

Figure 5:
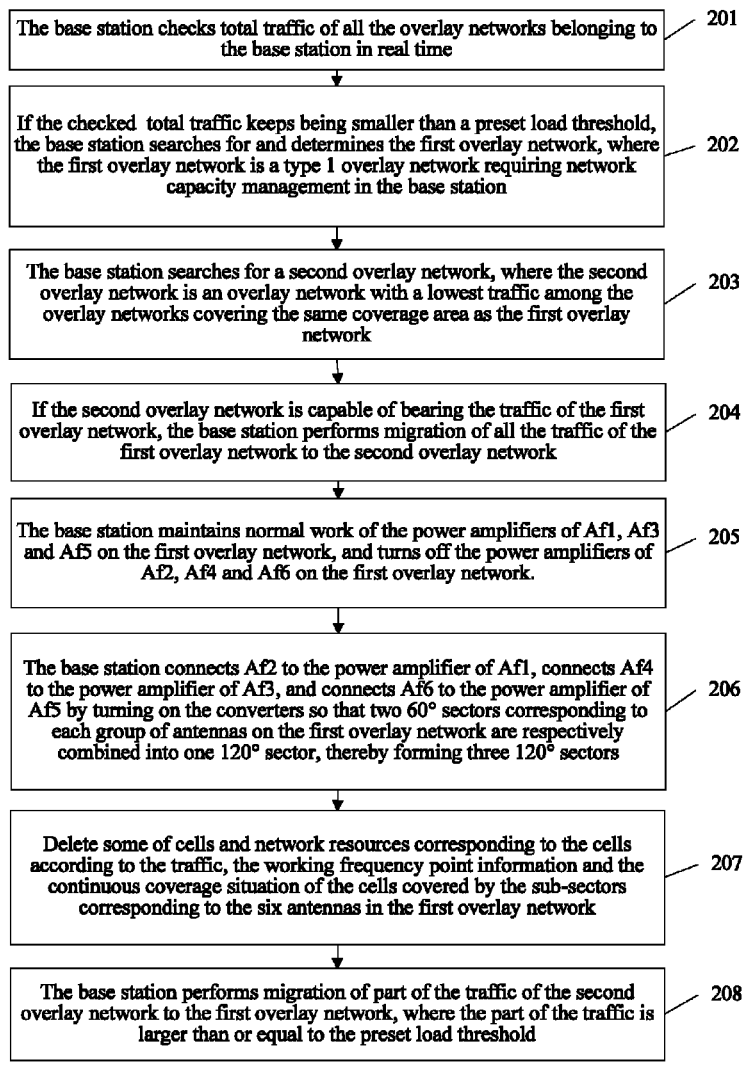
FIG. 5 is a flow chart of a method for managing capacity of a wireless communication network in Embodiment 2 of the present invention.

As shown in FIG. 5, a method for managing capacity of a wireless communication network based on the foregoing architecture includes the following steps:

201: The base station checks total traffic of all the overlay networks belonging to the base station in real time.

The total traffic of all the overlay networks belonging to the base station may be obtained in the following manner: base station downlink Guaranteed Bite Power (GBP) is generated according to a base station downlink load factor, and then the traffic of the overlay network is obtained by performing processing according to the base station data downlink GBP. How to obtain the traffic is a technology well known by a person skilled in the art, which is not described in detail in the embodiment of the present invention.

202: If the checked total traffic keeps being smaller than a preset load threshold, the base station searches for and determines the first overlay network, where the first overlay network is a type 1 overlay network requiring network capacity management in the base station.

That the total traffic keeps being smaller than the preset load threshold may be as follows: the total traffic is keeping being smaller than the preset load threshold in a preset time period, where the preset time period may be set by a user according to an actual situation, which is not described again in the embodiment of the present invention.

It should be noted that the base station searching for and determining the first overlay network may be implemented in the following manner, which specifically is: the base station searches for the type 1 overlay network among all the overlay networks belonging to the base station; if there is only one overlay network belonging to the type 1 overlay network, the base station determines the overlay network as the first overlay network; and if there are multiple overlay networks belonging to the type 1 overlay network, the base station determines the first overlay network according to traffic, working frequency point information or a continuous coverage situation of the multiple overlay networks belonging to the type 1 overlay network.

It should be noted that the working frequency point information includes a working frequency of the antennas configured for the overlay network, and that the continuous coverage situation of the overlay network indicates whether the cells covered by the sectors corresponding to the antennas configured for the overlay network are spatially continuous, which is not described again in the embodiment of the present invention.

It should be noted that one specific implementation of determining, by the base station, the first overlay network according to the traffic, working frequency point information or continuous coverage situation of the multiple overlay networks belonging to the type 1 overlay network may include the base station selecting an overlay network among the type 1 overlay networks as the first overlay network, where the overlay network has lowest traffic or a largest difference between its working frequency point and working frequency points of other overlay networks, or cells of the overlay network that are covered by the sectors corresponding to the configured antennas are spatially discontinuous.

203: The base station searches for a second overlay network, where the second overlay network is an overlay network with lowest traffic among the overlay networks covering a same coverage area as the first overlay network.

The second overlay network may be an overlay network of a 6-sector structure or an overlay network of a 3-sector structure. It is only required herein that the coverage area of the second overlay network is the same as the coverage area of the first overlay network, which is not described again in the embodiment of the present invention.

The preset load threshold may be determined by the user in the base station according to an actual situation, which is not limited by the embodiment of the present invention.

204: If the second overlay network is capable of bearing the traffic of the first overlay network, the base station performs migration of all the traffic of the first overlay network to the second overlay network.

It should be noted that, if the second overlay network is not capable of bearing the traffic of the first overlay network, the current network architecture remains unchanged, which is not described again in the embodiment of the present invention.

By executing step 204, it can be ensured that a user terminal, which accesses the first overlay network when the following steps are executed, obtains a desired service through the second overlay network, thereby guaranteeing service experience of the user.

205: The base station maintains normal work of the power amplifiers of Af1, Af3 and Af5 on the first overlay network and turns off the power amplifiers of Af2, Af4 and Af6 on the first overlay network.

The first overlay network is converted from a 6-sector structure into a 3-sector structure by executing step 205.

When step 204 is based on the foregoing configuration manner 1, step 204 may include the base station maintaining normal work of the power amplifiers of Af1, Af3 and Af5 on the first overlay network and turning off the power amplifiers of Af2, Af4 and Af6 on the first overlay network.

When step 204 is based on the foregoing configuration manner 2, step 204 may include the base station maintaining normal work of the power amplifiers of Af1, Af3 and Af5 on the first overlay network, turning off the power amplifiers of Af2, Af4 and Af6 on the first overlay network, and turning off the remote radio frequency units of Af2, Af4 and Af6. On the basis of the configuration manner 2, after the first overlay network is converted from 6 sectors into 3 sectors, the remote radio frequency units are turned off. Therefore, the power consumption of the remote radio frequency units that do not need to work is reduced, and energy-saving of the system is better achieved.

It should be noted that, when the first overlay network is converted from the 6-sector structure into the 3-sector structure, which power amplifier of an antenna in each group of antennas is selected and turned off may be preset in the base station. A specific manner for the presetting is a technology well known by a person skilled in the art, which is not described in detail in the embodiment of the present invention.

It should be noted that, if more than one antenna is configured in a 60° sector, the power amplifiers of multiple antennas in each group of antennas may maintain normal work, and the specific implementation method is similar to the method provided in the embodiment of the present invention, and therefore is not described in detail in the embodiment of the present invention.

206: The base station connects Af2 to the power amplifier of Af1, connects Af4 to the power amplifier of Af3, and connects Af6 to the power amplifier of Af5 by turning on the converters so that every two 60° sectors corresponding to each group of antennas on the first overlay network are combined into one 120° sector, thereby forming three 120° sectors.

In step 206, because the antenna of which the power amplifier is turned off is connected to the power amplifier of the antennas in a same group by turning on a corresponding converter, it is ensured that, after two 60° sectors corresponding to each group of antennas on the first overlay network are combined into one 120° sector, two cell coverage areas of two 60° sectors corresponding to each group of antennas are the same as the cell coverage area of one 120° sector.

207: Delete some cells and network resources corresponding to the cells according to the traffic, the working frequency point information or the continuous coverage situation of the cells covered by the sub-sectors corresponding to the six antennas in the first overlay network.

A specific implementation manner of step 207 is that: a cell with lowest traffic and network resources corresponding to the cell are selected and deleted; or, a cell with a largest difference between its working frequency point and working frequency points of other overlay networks and the network resources corresponding to the cell are selected; or, the cell which is spatially discontinuous with other cells and the network resources corresponding to the cell are selected and deleted.

208: The base station performs migration of part of the traffic of the second overlay network to the first overlay network, where the part of the traffic is larger than (i.e., greater than) or equal to the preset load threshold.

That the base station performs migration of part of the traffic on the second overlay network to the first overlay network may be implemented in a load balancing manner. Implementing traffic migration by performing load balancing is a technology publicly known by a person skilled in the art, which is not described again in the embodiment of the present invention.

In addition, it should be noted that, after the network capacity of the first overlay network is reduced by executing step 201 to step 208, work of the first overlay network may be stopped, and migration of the traffic of the first overlay network may be performed if the traffic of the first overlay network is very low.

Figure 6:
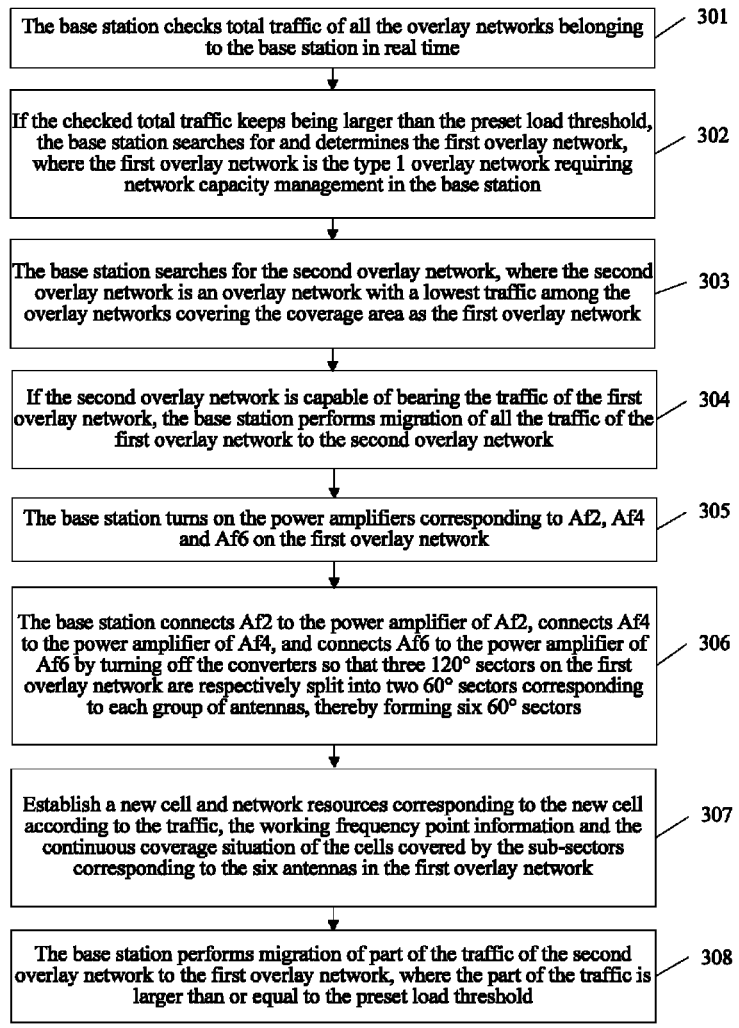
FIG. 6 is a flow chart of another method for managing capacity of a wireless communication network in Embodiment 2 of the present invention.

Further, after the execution of step 201 to step 208, the network capacity of the first overlay network is reduced. If the traffic of the first overlay network keeps being higher than the preset load threshold, the capacity of the base station needs to be increased. As shown in FIG. 6, the method for managing capacity of a wireless communication network based on the foregoing architecture further includes the following steps:

301: The base station checks the total traffic of all the overlay networks belonging to the base station in real time.

The specific implementation manner of step 301 is the same as that of step 201, which is not described herein again.

302: If the checked total traffic keeps being larger than the preset load threshold, the base station searches for and determines a first overlay network, where the first overlay network is the type 1 overlay network requiring network capacity management in the base station.

It should be noted that, the searching for and determining the first overlay network may be implemented in the following manner, which specifically is: the base station searches for the type 1 overlay network among all the overlay networks belonging to the base station; if there is only one overlay network belonging to the type 1 overlay network, the base station determines the overlay network as the first overlay network; and if there are multiple overlay networks belonging to the type 1 overlay network, the base station determines the first overlay network according to the traffic, the working frequency point information or the continuous coverage situation of the multiple overlay networks belonging to the type 1 overlay network.

It should be noted that, specific implementation of determining, by the base station, the first overlay network according to the traffic, the working frequency point information or the continuous coverage situation of multiple overlay networks belonging to the type 1 overlay network may include the base station selecting an overlay network among the type 1 overlay networks as the first overlay network, where the overlay network has high traffic or a smallest difference between its working frequency point and working frequency points of other overlay networks, or cells of the overlay network that are covered by the sectors corresponding to the configured antennas are spatially continuous.

303: The base station searches for a second overlay network, where the second overlay network is an overlay network with the lowest traffic among the overlay networks covering a same coverage area as the first overlay network.

304: If the second overlay network is capable of bearing the traffic of the first overlay network, the base station performs migration of all the traffic of the first overlay network to the second overlay network.

By executing step 304, it can be ensured that a user terminal, which accesses the first overlay network when the following steps are executed, obtains a desired service through the second overlay network, thereby guaranteeing service experience of the user.

305: The base station turns on the power amplifiers corresponding to Af2, Af4 and Af6 on the first overlay network.

The first overlay network is converted from the 3-sector structure into the 6-sector structure through step 305.

When step 305 is based on the foregoing configuration manner 1, step 305 may be that the base station turns on the power amplifiers corresponding to Af2, Af4 and Af6 on the first overlay network.

When step 305 is based on the foregoing configuration manner 2, step 305 may be that the base station turns on the remote radio frequency units corresponding to Af2, Af4 and Af6 on the first overlay network.

306: The base station connects Af2 to the power amplifier of Af2, connects Af4 to the power amplifier of Af4, and connects Af6 to the power amplifier of Af6 by turning off the converters so that three 120° sectors on the first overlay network are split into six 60° sectors of which every two 60° sectors correspond to each group of antennas.

It should be noted that, when three 120° sectors on the first overlay network are respectively split into two 60° sectors, two cell coverage areas of two 60° sectors corresponding to each group of antennas are the same as the cell coverage area of one 120° sector.

307: Establish new cell and network resources corresponding to the new cell according to the traffic, the working frequency point information or the continuous coverage situation of the cells covered by the sub-sectors corresponding to the six antennas in the first overlay network.

A specific implementation manner of step 307 is that the new cell and the network resources corresponding to the new cell are selected and established in a working frequency point of six antennas of the first overlay network, or the new cell and the network resources corresponding to the new cell are established in a blank area of the cells covered by the sub-sectors corresponding to the antennas.

308: The base station performs migration of part of the traffic of the second overlay network to the first overlay network, where the part of the traffic is larger than or equal to the preset load threshold.

In the method for managing capacity of a wireless communication network provided in the embodiment of the present invention, a converter is controlled to implement that, when the sectors are combined, the base station may turn off the power amplifiers of some antennas in the condition of not affecting the quality of service, thereby saving the energy; moreover, only one converter apparatus is added, and the implementation is simple; furthermore, because the cell numbers of the cells covered by the sub-sectors corresponding to each group of antennas are the same, the network resources do not need to be reallocated when the sectors are combined, thereby reducing complexity of a wireless configuration resource algorithm, and solving the problems in the conventional art that the energy is wasted, implementation of the apparatus is difficult, and the wireless configuration resource algorithm is complex.

Further, when the traffic of the first overlay network keeps being higher than the preset load threshold, the base station may increase capacity by turning off a converter, thereby ensuring the quality of service.

Embodiment 3

Figure 7:
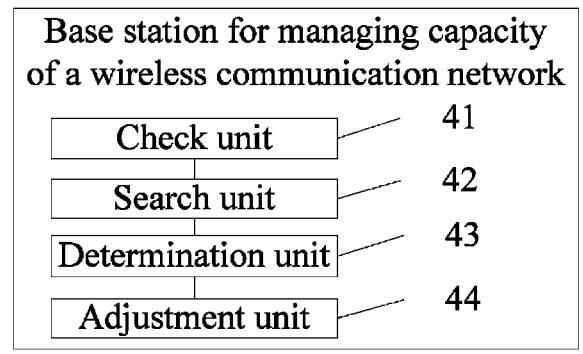
FIG. 7 is a composition block diagram of a base station for managing capacity of a wireless communication network in Embodiment 3 of the present invention.

An embodiment of the present invention provides a base station for managing capacity of a wireless communication network. The base station manages multiple overlay networks covering a same cell coverage area. The multiple overlay networks covering a same coverage area include a type 1 overlay network with a sector combining function. Multiple groups of antennas corresponding to each type 1 overlay network are configured. One power amplifier is configured for each antenna. As shown in FIG. 7, the base station includes a check unit 41, a search unit 42, a determination unit 43, and an adjustment unit 44.

The check unit 41 is configured to check the total traffic of all overlay networks managed by the base station.

The search unit 42 is configured to search for a type 1 overlay network among all the overlay networks belonging to the base station when the total traffic checked by the check unit 41 is smaller than a preset load threshold.

The determination unit 43 is configured to, when the search unit 42 finds only one overlay network belonging to the type 1 overlay network, determine the overlay network as a first overlay network; and when the search unit 42 finds multiple overlay networks belonging to the type 1 overlay network, determine the first overlay network according to network status parameters of the multiple overlay networks belonging to the type 1 overlay network, where the first overlay network is the type 1 overlay network which is managed by the base station and requires network capacity management.

The adjustment unit 44 is configured to maintain normal work of a power amplifier of at least one antenna in each group of antennas in the first overlay network determined by the determination unit 43 and turn off the power amplifiers of one or more other antennas. The adjustment unit 44 is also configured to connect the one or more other antennas to the power amplifiers maintaining normal work in the groups in which the one or more other antennas are located so that sub-sectors corresponding to each group of antennas among the multiple groups of antennas are respectively combined into multiple large sectors.

Optionally, the search unit 42 may further be configured to search for the type 1 overlay network among all the overlay networks belonging to the base station when the total traffic checked by the check unit 41 is smaller than the preset load threshold.

The adjustment unit 44 may further be configured to turn on all the turned-off power amplifiers in the first overlay network determined by the determination unit 43 and connect each group of antennas among the multiple groups of antennas to the power amplifiers corresponding to each group of antennas so that the multiple large sectors are split into the sub-sectors corresponding to the multiple groups of antennas.

Optionally, the determination unit 43 may be specifically configured to, when the search unit 42 finds multiple overlay networks belonging to the type 1 overlay network, determine the first overlay network according to traffic, working frequency point information or a continuous coverage situation of the multiple overlay networks belonging to the type 1 overlay network.

More specifically, in an embodiment, when the search unit finds multiple overlay networks belonging to the type 1 overlay network, the determination unit 43 may specifically select an overlay network among the type 1 overlay networks as the first overlay network, where the overlay network has lowest traffic or a largest difference between its working frequency point and working frequency points of other overlay networks, or cells of the overlay network that are covered by the sectors corresponding to the configured antennas are spatially discontinuous.

Figure 8:
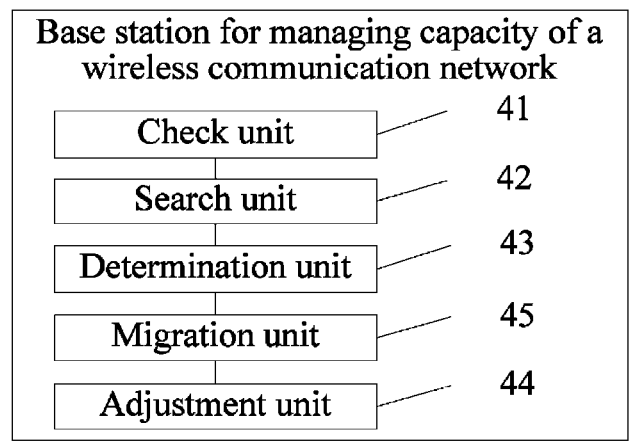
FIG. 8 is a composition block diagram of another base station for managing capacity of a wireless communication network in Embodiment 3 of the present invention.

Optionally, as shown in FIG. 8, the base station further includes a migration unit 45.

The migration unit 45 is configured to search for a second overlay network after the determination unit 43 determines the first overlay network, where the second overlay network is the overlay network with lowest traffic among overlay networks covering a same coverage area as the first overlay network, and performs migration of all the traffic of the first overlay network to the second overlay network if the second overlay network is capable of bearing the traffic of the first overlay network.

Figure 9:
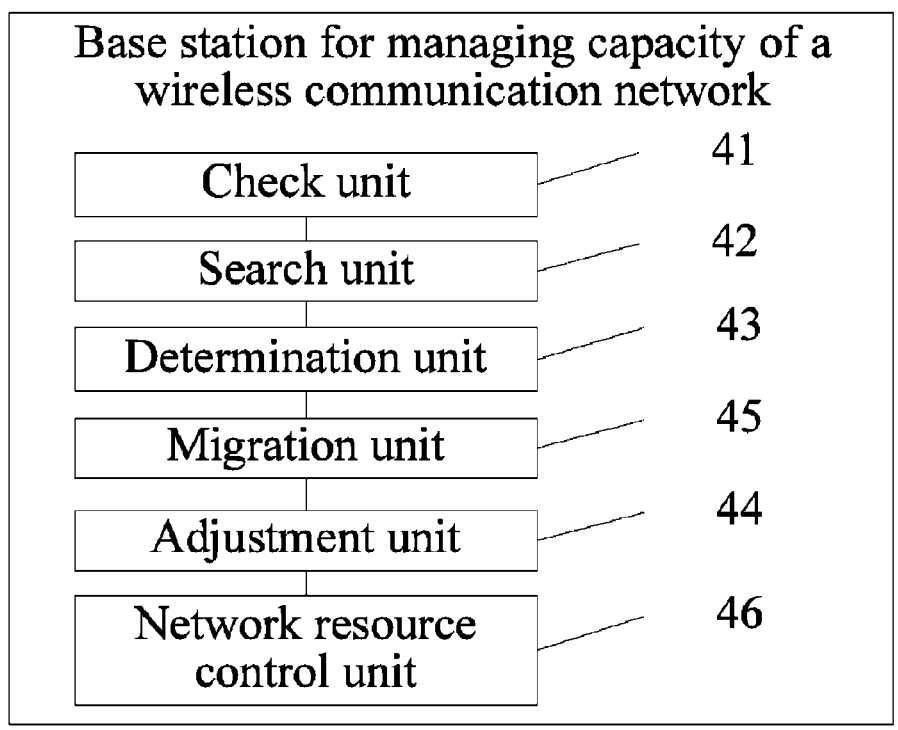
FIG. 9 is a composition block diagram of another base station for managing capacity of a wireless communication network in Embodiment 3 of the present invention.

Further, as shown in FIG. 9, the base station further includes a network resource control unit 46.

The network resource control unit is configured to delete some of the cells and the network resources corresponding to the cells according to the traffic, working frequency point information or continuous coverage situation of the cells covered by the sub-sectors corresponding to the antennas in the first overlay network after the adjustment unit 44 connects the one or more other antennas to the first power amplifiers in the groups in which the one or more other antennas are located, so that the combined sectors are capable of bearing the traffic of the remaining cells after the deletion.

Optionally, the network resource control unit 46 is configured to establish a new cell and network resources corresponding to the new cell according to the traffic, the working frequency point information or the continuous coverage situation of the cells covered by the sub-sectors corresponding to the antennas of the first overlay network after the adjustment unit 44 connects the multiple groups of antennas to the power amplifiers corresponding to the multiple groups of antennas.

In the method and the base station for managing capacity of a wireless communication network provided in the embodiment of the present invention, a converter is controlled to implement that, when the sectors are combined, the base station may turn off the power amplifiers of some antennas in the condition of not affecting the quality of service, thereby saving the energy, and solving the problem in the conventional art that the energy is wasted.

Further, when the traffic of the first overlay network keeps being higher than the preset load threshold, the base station may increase capacity by turning off the converter, thereby ensuring the quality of service.

Figure 10:
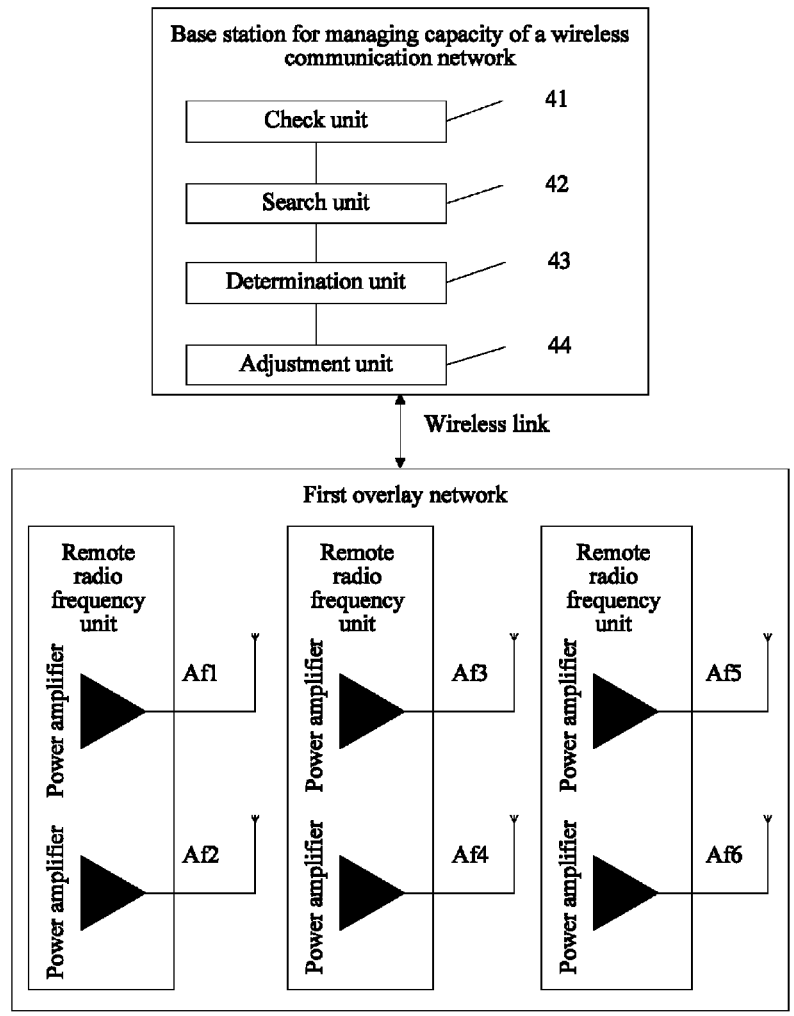
FIG. 10 is a schematic diagram of an application scenario provided by Embodiment 3 of the present invention.

FIG. 10 is a schematic diagram of an application scenario provided by the embodiment of the present invention. It can be seen from FIG. 10 that the base station in the foregoing embodiments may adjust a power amplifier of the first overlay network through a wireless link.

The method for managing capacity of a wireless communication network provided in the embodiment of the present invention may be applied to 3G or 4G technologies such as Global System for Mobile communications (GSM), Long Term Evolution (LTE), and High-Speed Packet Access (HSPA).

Through the above description of the embodiments, it is clear to a person skilled in the art that the present invention may be accomplished by software plus necessary universal hardware and definitely may also be accomplished by hardware, but in many cases, the software implementation is preferred. Based on this, the technical solutions of the present invention or the part that makes contributions to the conventional art can be substantially embodied in the form of a software product. The computer software product is stored in a readable storage medium, for example, a floppy disk, hard disk, or optical disk of the computer, and contains several instructions used to instruct computer equipment (for example, a personal computer, a server, or network equipment) to perform the methods according to the embodiments of the present invention.

The above descriptions are merely exemplary embodiments of the present invention, but not intended to limit the protection scope of the present invention. Any variations or replacement that can be easily derived by those skilled in the art within the technology scope disclosed by the present invention shall fall within the protection scope of the present invention. Therefore, the protection scope of the present invention is subject to the protection scope of the claims.

What is claimed is:

1. A method for managing capacity of a wireless communication network comprising:
   checking total traffic of multiple overlay networks managed by a base station, wherein at least one of the overlay networks has a multi-sector structure and the multiple overlay networks covering a same coverage area, wherein the multiple overlay networks covering a same coverage area comprise a type 1 overlay network with a sector combining function, wherein multiple groups of antennas corresponding to each type 1 overlay network are configured, and wherein one power amplifier is configured for each antenna;
   searching for the type 1 overlay network among all the overlay networks belonging to the base station based on a determination that the checked total traffic is less than a preset load threshold;
   determining a first overlay network when there is only one overlay network belonging to the type 1 overlay network;
   determining a second overlay network according to network status parameters of the multiple overlay networks belonging to the type 1 overlay network when there are multiple overlay networks belonging to the type 1 overlay network, wherein the first overlay network is a type 1 overlay network which is managed by the base station and requires network capacity management;
   maintaining normal work of a power amplifier of at least one antenna in each group of antennas in the first overlay network and turning off power amplifiers of one or more other antennas; and
   connecting the one or more other antennas to the power amplifier maintaining normal work in the groups in which the one or more other antennas are located such that sub-sectors corresponding to each group of antennas among the multiple groups of antennas are respectively combined into multiple large sectors;
   wherein the type 1 overlay network further has a sector splitting function, and wherein after the total traffic of all the overlay networks managed by the base station is checked, the method further comprises:
   searching for the type 1 overlay network among all the overlay networks belonging to the base station based on a determination that the checked total traffic is greater than the preset load threshold;
   determining the overlay network as the first overlay network when there is only one overlay network belonging to the type 1 overlay network;
   determining the first overlay network according to network status parameters of the multiple overlay networks belonging to the type 1 overlay network when there are multiple overlay networks belonging to the type 1 overlay network, wherein the first overlay network is a type 1 overlay network which is managed by the base station and requires network capacity management;
   turning on all power amplifiers in the first overlay network that are already turned off; and
   connecting each group of antennas in the multiple groups of antennas to power amplifiers corresponding to each group of antennas such that the multiple large sectors are split into the sub-sectors corresponding to the multiple groups of antennas.

2. The method for managing capacity of a wireless communication network according to claim 1, wherein determining the first overlay network according to the network status parameters of the multiple overlay networks belonging to the type 1 overlay network comprises determining the first overlay network according to traffic, working frequency point information or a continuous coverage situation of the multiple overlay networks belonging to the type 1 overlay network.

3. The method for managing capacity of a wireless communication network according to claim 2, wherein determining the first overlay network according to the traffic, working frequency point information or continuous coverage situation of the multiple overlay networks belonging to the type 1 overlay network comprises selecting an overlay network among the type 1 overlay networks as the first overlay network, wherein the overlay network has a lowest amount of traffic or a largest difference between its working frequency point and working frequency point of other overlay networks, or cells of the overlay network that are covered by sectors corresponding to the configured antennas are spatially discontinuous.

4. The method for managing capacity of a wireless communication network according to claim 1, wherein after determining the first overlay network and before maintaining normal work of the power amplifier of at least one antenna in each group of antennas in the first overlay network, the method further comprises:
   searching for a second overlay network, wherein the second overlay network is an overlay network with a lowest amount of traffic among overlay networks covering a same coverage area as the first overlay network; and
   performing migration of all the traffic of the first overlay network to the second overlay network based on a determination that the second overlay network is capable of bearing traffic of the first overlay network.

5. The method for managing capacity of a wireless communication network according to claim 1, wherein after determining the first overlay network and before connecting each group of antennas in the multiple groups of antennas to the power amplifiers corresponding to each group of antennas, the method further comprises:
   searching for a second overlay network, wherein the second overlay network is an overlay network with a lowest amount of traffic among overlay networks covering a same coverage area as the first overlay network; and
   performing migration of all the traffic of the first overlay network to the second overlay network based on a determination that the second overlay network is capable of bearing traffic of the first overlay network.

6. The method for managing capacity of a wireless communication network according to claim 1, wherein after connecting the one or more other antennas to the first power amplifiers in the groups in which the one or more other antennas are located, the method further comprises according to traffic, working frequency point information or a continuous coverage situation of cells covered by sub-sectors corresponding to the antennas in the first overlay network, deleting some cells and network resources corresponding to the cells such that the combined sectors are capable of bearing the traffic of the remaining cells after the deletion.

7. The method for managing capacity of a wireless communication network according to claim 1, wherein after connecting the multiple groups of antennas to the power amplifiers corresponding to the multiple groups of antennas, the method further comprises establishing a new cell and network resources corresponding to the new cell according to traffic, working frequency point information or a continuous coverage situation of cells covered by sub-sectors corresponding to the antennas of the first overlay network.

8. The method for managing capacity of a wireless communication network according to claim 4, wherein after connecting the one or more other antennas to the first power amplifiers in the groups in which the one or more other antennas are located, the method further comprises migrating a part of traffic of the second overlay network to the first overlay network, wherein the part of the traffic is less than or equal to the preset load threshold.

9. A base station for managing capacity of a wireless communication network comprising:
   a check unit configured to check total traffic of multiple overlay networks managed by the base station, wherein the base station manages multiple overlay networks covering the same cell coverage areas, wherein the multiple overlay networks covering the same cell coverage areas comprise a type 1 overlay network with a sector combining function, wherein multiple groups of antennas corresponding to each type 1 overlay network are configured, and wherein one power amplifier is configured for each antenna;
   a search unit configured to search for the type 1 overlay network among all the overlay networks belonging to the base station when an amount of the total traffic checked by the check unit is less than a first preset load threshold;
   a determination unit configured to, when the search unit finds only one overlay network belonging to the type 1 overlay network, determine a first overlay network, and when the search unit finds multiple overlay networks belonging to the type 1 overlay network, determine a second overlay network according to network status parameters of the multiple overlay networks belonging to the type 1 overlay network, wherein the first overlay network is a type 1 overlay network which is managed by the base station and requires network capacity management; and
   an adjustment unit configured to maintain normal work of a power amplifier of at least one antenna in each group of antennas in the first overlay network determined by the determination unit, turn off power amplifiers of one or more other antennas, and connect the one or more other antennas to the power amplifier maintaining normal work in the groups in which the one or more other antennas are located such that sub-sectors corresponding to each group of antennas among the multiple groups of antennas are respectively combined into multiple large sectors;
   wherein the search unit is further configured to search for the type 1 overlay network among all the overlay networks belonging to the base station when an amount of the total traffic checked by the check unit is greater than a second preset load threshold, and wherein the adjustment unit is further configured to turn on all power amplifiers already turned off in the first overlay network determined by the determination unit and connect each group of antennas among the multiple groups of antennas to power amplifiers corresponding to each group of antennas such that the multiple large sectors are split into the sub-sectors corresponding to the multiple groups of antennas.

10. The base station for managing capacity of a wireless communication network according to claim 9, wherein the determination unit is further configured to, when the search unit finds multiple overlay networks belonging to the type 1 overlay network, determine the first overlay network according to traffic, working frequency point information or a continuous coverage situation of the multiple overlay networks belonging to the type 1 overlay network.

11. The base station for managing capacity of a wireless communication network according to claim 10, wherein the determination unit is further configured to, when the search unit finds multiple overlay networks belonging to the type 1 overlay network, select an overlay network among the type 1 overlay networks as the first overlay network, wherein the overlay network has a lowest amount of traffic or a largest difference between its working frequency point and working frequency points of other overlay networks, or cells of the overlay network that are covered by sectors corresponding to the configured antennas are spatially discontinuous.

12. The base station for managing capacity of a wireless communication network according to claim 9, further comprising a migration unit configured to search for a second overlay network after the determination unit determines the first overlay network, wherein the second overlay network is an overlay network with a lowest amount of traffic among overlay networks covering a same coverage area as the first overlay network, and wherein the migration unit is further configured to perform migration of all traffic of the first overlay network to the second overlay network based on a determination that the second overlay network is capable of bearing traffic of the first overlay network.

13. The base station for managing capacity of a wireless communication network according to claim 9, further comprising a network resource control unit configured to delete some cells and network resources corresponding to the cells according to traffic, working frequency point information or a continuous coverage situation of cells covered by sub-sectors corresponding to the antennas in the first overlay network after the adjustment unit connects the one or more other antennas to the first power amplifiers in the groups in which the one or more other antennas are located such that the combined sectors are capable of bearing traffic of the remaining cells after the deletion.

14. The base station for managing capacity of a wireless communication network according to claim 9, wherein the network resource control unit is further configured to, after the adjustment unit connects the multiple groups of antennas to the power amplifiers corresponding to the multiple groups of antennas, establish a new cell and network resources corresponding to the new cell according to traffic, working frequency point information or a continuous coverage situation of cells covered by sub-sectors corresponding to the antennas of the first overlay network.

* * * * *

UNITED STATES PATENT AND TRADEMARK OFFICE
CERTIFICATE OF CORRECTION

PATENT NO. : 8,620,223 B2  
APPLICATION NO. : 13/686105  
DATED : December 31, 2013  
INVENTOR(S) : Zhang et al.

Page 1 of 1

It is certified that error appears in the above-identified patent and that said Letters Patent is hereby corrected as shown below:

On the Title page, item [71], Applicant's City of Residence "Guangdong (CN)" should read -- Shenzhen (CN) --.

Signed and Sealed this
Twentieth Day of May, 2014

Michelle K. Lee
*Deputy Director of the United States Patent and Trademark Office*